United States Patent
Raja et al.

(10) Patent No.: US 11,591,421 B2
(45) Date of Patent: Feb. 28, 2023

(54) PROCESS FOR PRODUCING ETHYLENE COPOLYMERS

(71) Applicant: ExxonMobil Chemical Patents Inc., Baytown, TX (US)

(72) Inventors: Rajesh Puthenkovilakom Raja, Baytown, TX (US); Jeffrey D. Daily, Baton Rouge, LA (US); Amit Kumar Ghosh, Brussels (BE); Anna C. Claerbout, Flanders (BE); Linda M. Van den Bossche, Zwijndrecht (BE); Paul J. Clymans, Kapelle-Op-Den-Bos (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 302 days.

(21) Appl. No.: 16/632,711

(22) PCT Filed: May 8, 2018

(86) PCT No.: PCT/US2018/031487
§ 371 (c)(1),
(2) Date: Jan. 21, 2020

(87) PCT Pub. No.: WO2019/027525
PCT Pub. Date: Feb. 7, 2019

(65) Prior Publication Data
US 2020/0148800 A1 May 14, 2020

Related U.S. Application Data

(60) Provisional application No. 62/539,197, filed on Jul. 31, 2017.

(51) Int. Cl.
*C08F 210/02* (2006.01)
*C08F 218/08* (2006.01)
(Continued)

(52) U.S. Cl.
CPC .............. *C08F 210/02* (2013.01); *C08F 2/34* (2013.01); *C08F 2/38* (2013.01); *C08F 218/08* (2013.01); *C08K 5/01* (2013.01); *C08K 5/14* (2013.01)

(58) Field of Classification Search
CPC combination set(s) only.
See application file for complete search history.

(56) References Cited

U.S. PATENT DOCUMENTS

2010/0087606 A1  8/2010  Karjala et al.
2017/0183430 A1  6/2017  Devisme et al.

FOREIGN PATENT DOCUMENTS

DE        1520227 A1    1/1970
DE         161028 A1    8/1984
(Continued)

*Primary Examiner* — Catherine S Branch
(74) *Attorney, Agent, or Firm* — ExxonMobil Chemical Patents Inc.—Law Department

(57) ABSTRACT

A process for producing an ethylene copolymer, the process including: (a) contacting ethylene with at least one polar comonomer in the presence of at least one modifier and at least one free radical initiator in a tubular reactor under polymerization conditions including a pressure of from 225 to 270 MPa; (b) injecting the at least one free radical initiator into the reactor at a plurality of reaction zones spaced along the length of the reactor, wherein each reaction zone comprises an inlet and an outlet; (c) maintaining the temperature at the inlet of each reaction zone at 150° C. or less, and the temperature at the outlet of each reaction zone is at least 177° C.; (d) controlling the modifier flow at a rate of from 0.02 to 0.986 wt % of the copolymer; and (e) recovering the ethylene copolymer from the tubular reactor, is provided.

16 Claims, 4 Drawing Sheets

(51) Int. Cl.
*C08F 2/34* (2006.01)
*C08F 2/38* (2006.01)
*C08K 5/01* (2006.01)
*C08K 5/14* (2006.01)

(56) References Cited

FOREIGN PATENT DOCUMENTS

| GB | 1443394 | 7/1976 | | |
|---|---|---|---|---|
| WO | 2002057354 | 7/2002 | | |
| WO | WO-2013154690 A1 * | 10/2013 | ............. | B01J 19/00 |
| WO | WO-2015166297 A1 * | 11/2015 | ............. | C08F 10/02 |

* cited by examiner

PROCESS FOR PRODUCING ETHYLENE COPOLYMERS

CROSS REFERENCE TO RELATED APPLICATIONS

This application is a National State Application of International Application No. PCT/US2018/031487 filed May 8, 2018, which claims the benefit of U.S. Ser. No. 62/539,197, filed Jul. 31, 2017, the disclosure of which is hereby incorporated by reference in its entirety.

FIELD OF THE INVENTION

This invention relates to the production and use of ethylene copolymers containing polar comonomers, especially vinyl acetate, made from tubular and/or autoclave reactors.

BACKGROUND OF THE INVENTION

High pressure ethylene copolymers incorporating polar comonomers (e.g., vinyl acetate) have a wide range of uses including film production, hot melt adhesive formulation, coatings, extrusion coating, extrusion and coextrusion, blow molding, lamination, injection molding, wire and cable, and resin modification. More recently, because of their transparency, stability, durability and ease of processing, interest has focused on using high pressure ethylene-vinyl acetate copolymers (EVAs) as encapsulants for solar cells.

High pressure EVA copolymers and other high pressure ethylene polymers, such as low density polyethylene (LDPE) and acrylate modified polyethylene (e.g. EMA, EnBA, EAA), are commercially produced using two different process technologies, one employing autoclave reactors (CSTR concept) and the other employing tubular reactors (plug flow concept). For example, EP 2 513 162 A discloses a high pressure polymerization process to form ethylene-based polymers, including EVA, comprising the steps of: (a) injecting a first feed comprising ethylene and optionally a chain transfer agent system (CTA system) into a first autoclave reactor zone operating at polymerization conditions to produce a first zone reaction product, the CTA system of the first reactor zone having a transfer activity Z1; and (b) (1) transferring at least part of the first zone reaction product to a second reactor zone selected from a second autoclave reactor zone or a tubular reactor zone and operating at polymerization conditions, and, optionally, (2) freshly injecting a second feed into the second reactor zone to produce a second zone reaction product, with the proviso that the second reactor zone contains a CTA system having a transfer activity Z2; and with the proviso that the ratio of Z1/Z2 is less than 1.

However, there are significant differences between polymers of the same composition produced using the different technologies in terms of product characteristics, processing and product performance, due to the differences in molecular architecture, molecular weight distribution, and long chain branching characteristics, etc. For example, high pressure polyethylene products produced in autoclave reactors tend to show broader molecular weight distribution and more long chain branching, resulting in better flowability, melt strength, and melt processing characteristics, than equivalent polymers produced in tubular reactors. However, autoclave reactor polymers tend to exhibit deficiencies in conversion rates (throughput) and final product performance (e.g., too much shrinkage and reduced mechanical properties) when compared to the tubular reactor products.

There is therefore interest in finding processes for producing high pressure polyethylene products which combine the high conversion rates associated with tubular reactors with the molecular architecture characteristics (broad molecular weight distribution, long chain branching, and lower crystallization temperatures) of an autoclave polymer product.

SUMMARY OF THE INVENTION

It has now been found that high pressure ethylene copolymers with an autoclave-like molecular architecture (e.g., one or more of broad molecular weight distribution, high long chain branching and rheology) can be produced in a tubular reactor without sacrificing conversion rate and throughput. This has been achieved using new process conditions (e.g., lower reactor pressure, lower initiator inlet temperature while keeping the peak reactor temperature substantially unchanged and controlling modifier flow). Without wishing to be restricted by theory of operation, it is believed that the new process conditions enable better control over the molecular chain growth resulting in an autoclave-like molecular architecture for the polymer.

Thus, in a class of embodiments, the invention provides for a process for producing an ethylene copolymer, the process comprising:
  (a) contacting ethylene with at least one polar comonomer in the presence of at least one modifier and at least one free radical initiator in a tubular reactor under polymerization conditions including a pressure of from 225 to 270 MPa;
  (b) injecting the at least one free radical initiator into the reactor at a plurality of reaction zones spaced along the length of the reactor, wherein each reaction zone comprises an inlet and an outlet;
  (c) maintaining the temperature at the inlet of each reaction zone at 150° C. or less, and the temperature at the outlet of each reaction zone at at least 177° C.;
  (d) controlling the modifier flow at a rate of from 0.02 to 0.986 wt % of the copolymer; and
  (e) recovering the ethylene copolymer from the tubular reactor.

DETAILED DESCRIPTION OF THE EMBODIMENTS

Figure 1:
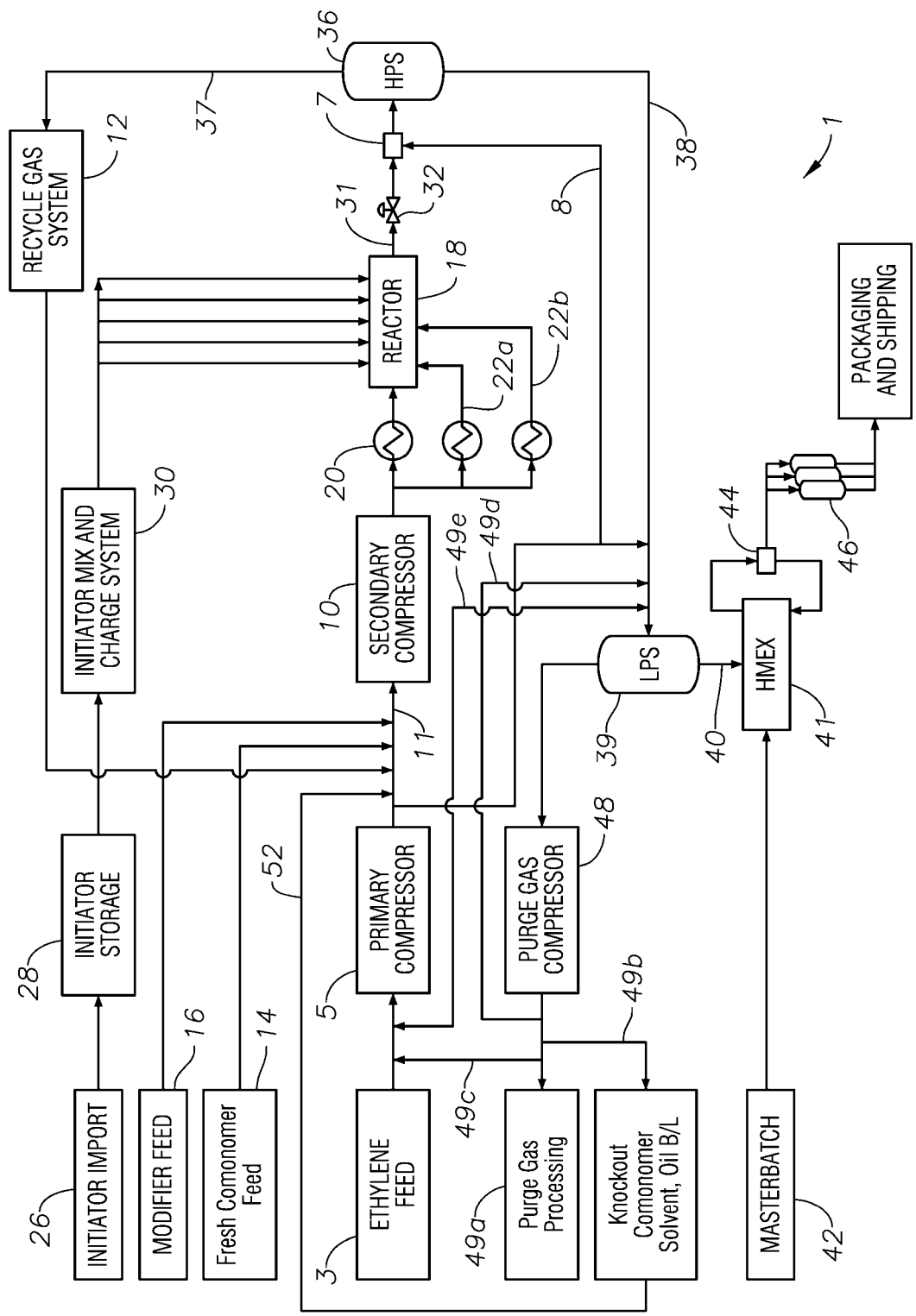
FIG. 1 is a schematic illustration of a tubular process for producing a high pressure ethylene copolymer according to one embodiment of the invention.

Described herein is a continuous process for producing ethylene copolymers by free radically initiated polymerization in a high pressure tubular reactor in which the process conditions are controlled so that the copolymer product has molecular architecture (e.g., one or more of a broad molecular weight distribution, high long chain branching and rheology) which is more consistent with equivalent copolymers produced in an autoclave reactor according to several classes of embodiments of the invention.

In a high pressure process of a class of embodiments, gaseous ethylene is pressurized and supplied together with at least one polar comonomer, at least one modifier, and at least one free radical initiator to a tubular reactor operating under polymerization conditions including a pressure from 225 to 270 MPa, such as from 230 to 255 MPa. The reaction is highly exothermic and the tubular reactor comprises a plurality of reaction zones spaced along the length of the reactor, wherein each reaction zone comprises an inlet and an outlet spaced from the inlet, with a cooling section being provided at least between each reaction zone outlet and the inlet of the adjacent reaction zone. Typically, each reaction zone is encased in a cooling jacket.

Portions of the free radical initiator(s) are injected into each reaction zone at the inlet, where the temperature of the reaction zone is no more than 150° C., such as no more than 145° C., and in some embodiments is at least 125° C., such as at least 130° C. The temperature in each reaction zone increases as the reactants flow through the zone such that the temperature at the outlet of each reaction zone is at least 177° C., such as at least 200° C., and in some embodiments is no more than 215° C., such as no more than 300° C. The reactant stream is then cooled in the adjacent cooling section before the reactants enter the inlet of the next reaction zone. After leaving the final reaction zone, the product effluent is decompressed and cooled before being fed to one or more separators for recovery of the copolymer. Unreacted ethylene is then recompressed before being recycled to the tubular reactor.

The high pressure polyethylene produced according to the present process includes polymer units derived from ethylene and one or more polar comonomers. The amount of polymer units derived from ethylene can be up to 99.0 wt %, such as from 50.0 wt % to 99 wt %, for example from 60.0 wt % to about 90.0 wt % or about 65.0 wt % to about 80.0 wt %, based on the total weight of the copolymer. The amount of polymer units derived from polar comonomers can be up to 95.0 wt % and can also range from about 1.0 wt % to about 50.0 wt %; such as from about 1.0 wt % to about 49.0 wt %; such as from about 5.0 wt % to about 45.0 wt %; such as from about 10.0 wt % to about 40.0 wt % or about 20.0 wt % to about 35.0 wt %, based on the total weight of the copolymer.

Suitable polar comonomers include, but are not limited to: vinyl ethers such as vinyl methyl ether, vinyl n-butyl ether, vinyl phenyl ether, vinyl beta-hydroxy-ethyl ether, and vinyl dimethylamino-ethyl ether; olefins such as propylene, butene-1, cis-butene-2, transbutene-2, isobutylene, 3,3,-dimethylbutene-1,4-methylpentene-1, octene-1, and styrene; vinyl type esters such as vinyl acetate, vinyl butyrate, vinyl pivalate, and vinylene carbonate; haloolefins such as vinyl fluoride, vinylidene fluoride, tetrafluoroethylene, vinyl chloride, vinylidene chloride, tetrachloroethylene, and chlorotrifluoroethylene; acrylic-type esters such as methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3,-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxethyl methacrylate, beta-hydroxpropyl methacrylate, 3-hydroxy-4-carbo-methoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, and methyl crotonate; other acrylic-type derivatives such as acrylic acid, methacrylic acid, crotonic acid, maleic acid, methyl hydroxy, maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenylmethacrylamide, N-ethylmaleimide, and maleic anhydride; and other compounds such as allyl alcohol, vinyltrimethylsilane, vinyltriethoxysilane, N-vinylcarbazole, N-vinyl-N-methylacetamide, vinyldibutylphosphine oxide, vinyldiphenylphosphine oxide, bis-(2-chloroethyl) vinylphosphonate, and vinyl methyl sulfide.

In one preferred embodiment, the at least one polar comonomer comprises vinyl acetate. Thus, the present process can be used to produce EVA copolymers with a wide variety of compositions, for example with a vinyl acetate content (or derived units) varying between 3 to 45 wt %, such as from 10 to 45 wt %, for example, 20 to 33 wt % based upon the weight of the copolymer. Similarly, the process can be employed to produce EVA copolymers with a wide range of melt index values, such as from 1 to 990 gm per 10 minutes, for example, from 15 to 50 gm per 10 minutes, such as from 22 to 32 gm per 10 minutes, all as measured at 190° C. under a load of 2.16 kg according to ASTM D1238. The process can also be employed to produce EVA copolymers with melt viscosity (at 190° C.) ranging from 10 mPa·s to 10000 mPa·s according to ASTM D3236.

In addition to ethylene and at least one polar comonomer, the feed to present process includes at least one modifier different from ethylene and the polar comonomer. Generally, the modifier is a $C_2$ to $C_{12}$ compound. Suitable modifiers, also called chain transfer agents, can include, but are not limited to, tetramethylsilane, cyclo propane, sulfur hexafluoride, methane, t-butanol, perfluoro propane, deuterobenzene, ethane, ethylene oxide, 2,2-dimethylpropane, benzene, dimethyl sulfoxide, vinyl methylether, methanol, propane, 2-methyl-3-butene-2-ol, methyl acetate, t-butyl acetate, methyl formate, ethyl acetate, butane, triphenylphosphine, methylamine, methyl benzoate, ethylbenzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetonitrile, N-ethylacetamide, propylene, 1-butene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1,2-methylbutene 2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, trin-butylphosphine, dimethylphosphine, methyl cyanoacetate, carbon tetrachloride, bromotrichloromethane, di-n-butylphosphine, acetaldehyde, proprionaldehyde, and phosphine. Further details and other suitable transfer agents are described in Advances in Polymer Science, Vol. 7, pp. 386-448 (1970).

In some embodiments, the modifier comprises one or more of propylene, propane, butenes, butanes, isopentane, hexenes, hexanes, acetaldehyde, propionaldehyde and mixtures thereof.

The amount of modifier supplied to the tubular reactor may be controlled so to be within the range of 0.02 wt % to 0.986 wt %, such as from 0.08 wt % to 0.9 wt %, such as from 0.15 to 0.8 wt %, such as from 0.2 wt % to 0.7 wt %, of the polymer product.

Suitable initiators for use in the present polymerization process can include, but are not limited to: oxygen, peroxide compounds such as hydrogen peroxide, decanoyl peroxide, t-butyl peroxy neodecanoate, t-butyl peroxypivalate, 3,5,5-trimethylhexanoyl peroxide, diethyl peroxide, t-butyl peroxy-2-ethylhexanoate, t-butyl peroxy isobutyrate, benzoyl peroxide, t-butyl peroxy acetate, t-butyl peroxy benzoate, di-t-butyl peroxide, di (2-ethyl, hexyl) peroxydicarbonate, and 1,1,3,3 tetramethyl butyl hydroperoxide; alkali metal persulfates, perborates and percarbonates; and azo compounds such as azo bis isobutyronitrile. Organic peroxide initiators are preferred. Suitable organic peroxide initiators can include t-butylperoxy neodecanoate, t-butyl peroxypivalate, t-butyl peroxy 2-ethyl hexanoate, t-butyl peroxy isobutyrate, and di (2-ethyl, hexyl) peroxydicarbonate. Particularly preferred is, di(2-ethyl hexyl) peroxydicarbonate, t-butyl-peroxypivalate, t-butyl-peroxyneodecanoate, t-butyl-peroxy-2-ethylhexanoate, and mixtures thereof. Preferably, the reaction mixture contains less than 0.25 wt % initiator, based on the total weight of the reaction mixture. The amount of the initiator(s) can range from a low of about 0.01 wt %, 0.025 wt %, 0.035 wt %, or 0.05 wt % to a high of about 0.06 wt %, 0.08 wt %, 0.10 wt %, 0.15 wt %, 0.2 wt % or 0.25 wt %, based on the total weight of the reaction mixture.

One or more diluents/solvents can be added to the initiator. Suitable diluents/solvents can include one or more non-coordinating, inert liquids including, but not limited to, straight and branched-chain hydrocarbons such as propane, isobutane, butane, pentane, isopentane, hexanes, isohexane, heptane, octane, n-octane, dodecane, isododecane, and mixtures thereof; cyclic and alicyclic hydrocarbons such as cyclohexane, cycloheptane, methylcyclohexane, methylcycloheptane, and mixtures thereof perhalogenated hydrocarbons such as perfluorinated $C_4$ to $C_{10}$ alkanes, chlorobenzene; and aromatic and alkyl-substituted aromatic compounds such as benzene, toluene, mesitylene, and xylene. Suitable solvents also include liquid olefins which may act as monomers or comonomers including ethylene, propylene, 1-butene, isobutylene, 1-hexene, 1-pentene, 3-methyl-1-pentene, 4-methyl-1-pentene, 1-octene, 1-decene, and mixtures thereof. In certain embodiments, the initiator can include butane, n-octane, or a mixture of one or more $C_9$ to $C_{12}$ paraffinic hydrocarbons.

One or more stabilizers, such as antioxidants, can be added to the initiator. Suitable stabilizers include one or more of phenolic compounds or phosphate compounds or combinations thereof, but not limited to butylated hydroxytoluene (BHT), 2,6-didert-butyl-4-ethylphenol (BHEB), octadecyl-3-(3,5-di-tert.butyl-4-hydroxyphenyl)-propionate (Irganox 1076), pentaerythritol tetrakis(3,5-di-tert-butyl-4-hydroxyhydrocinnamate) (Irganox 1010), and Di-tertiary butyl phenyl phosphite (Irgafos 168).

Despite being produced in a tubular reactor, the copolymers of the present process surprisingly exhibits molecular architecture typical of equivalent polymers produced using autoclave reactors. For example, EVA copolymers produced by the present process may have a broad molecular weight distribution, for example, as manifested by a polydispersity index (PDI) greater than 1.0, and a high level long chain branching, for example as manifested by a viscosity average branching index at least 0.25 as measured according to GPC-3D and a Z average branching index at least 0.08 as measured according to GPC-3D. In addition, depending on the type of lubricant used in the compressors required to provide the high pressure ethylene to the tubular reactor, the EVA polymer produced by the present process may have a volume resistivity of 2.5E+14 Ω·cm to 7.7E+17 Ω·cm.

The EVA polymer can contain one or more antioxidants. Suitable antioxidants include one or more of phenolic compounds or phosphate compounds or combination thereof, but not limited to butylated hydroxytoluene (BHT), 2,6-Ditert-butyl-4-ethylphenol (BHEB), octadecyl-3-(3,5-di-tert.butyl-4-hydroxyphenyl)-propionate (Irganox 1076), Pentaerythritol tetrakis(3,5-di-tert-butyl-4-hydroxyhydrocinnamate) (Irganox 1010), Di-tertiary butyl phenyl phosphite (Irgafos 168). Phenolic antioxidants are preferred, such as butylated hydroxytoluene (BHT) or other derivatives containing butylated hydroxytoluene units such as Irganox 1076 or Irganox 1010 and alike. The antioxidant can be present in an amount less than 0.05 wt %, based on the total weight of the copolymer. When present, for example, the amount of the one or more antioxidants can range from a low of about 0.001 wt %, 0.005 wt %, 0.01 wt %, or 0.015 wt % to a high of about 0.02 wt %, 0.03 wt %, 0.04 wt %, or 0.05 wt %.

The copolymer can further contain one or more additives. Suitable additives can include, but are not limited to: stabilization agents such as antioxidants or other heat or light stabilizers; anti-static agents; crosslink agents or coagents; crosslink promotors; release agents; adhesion promotors; plasticizers; or any other additive and derivatives known in the art. Suitable additives can further include one or more anti-agglomeration agents, such as oleamide, stearamide, erucamide or combination thereof or other derivatives with the same activity as known to the person skilled in the art. The copolymers may contain less than 0.50 wt % of such additives, based on the total weight of the copolymer. When present, the amount of the additives can also range from a low of about 0.01 wt %, 0.02 wt %, 0.03 wt %, or 0.05 wt % to a high of about 0.06 wt %, 0.08 wt %, 0.11 wt %, or 0.15 wt %, or 0.25 wt %, or 0.35 wt %, or 0.45 wt %, or 0.50 wt %.

The copolymers of the present process may be used in a wide variety of applications including, but not limited to, wire and cable, photo voltaic cell encapsulant, adhesives, blown film, cast film, extrusion coating, molded articles, master batch resins, pigment/filler concentrates, color concentrates, color compounds, and molded compounds.

FIG. 1 schematically depicts an illustrative high pressure polymerization system 1 suitable for producing a high pressure polyethylene copolymers according to one embodiment of the present invention. The system 1 can include an ethylene feed source 3 that supplies ethylene monomer to a primary compressor 5 that pressurizes the ethylene to a pressure of about 15 MPa to about 20 MPa or about 20 MPa to about 30 MPa, or about 30 MPa to about 35 MPa. Under normal operating conditions, all or substantially all of the ethylene discharged from the primary compressor 5 can be directed to a jet pump 7 via line 8. A secondary compressor 10 located downstream of, and in fluid communication with the primary compressor 5, increases the pressure of the reactor feed (line 11), which includes the ethylene feed discharged from the primary compressor 5. The secondary compressor 10 boosts the reactor feed 11 to the required reaction pressure of from 225 to 270 MPa.

As indicated in FIG. 1, other reaction components can be injected into the suction inlet of the second compressor 10 along with the ethylene monomer, including one or more polar comonomers, such as vinyl acetate, from comonomer feed 14. One or more modifiers from modifier feed 16 can also be injected into the suction inlet of the second compressor 10 along with the ethylene monomer and one or more polar comonomers.

The compressed reactor feed stream exiting the secondary compressor 10 can be split into two or more streams. At least one split stream can be heated or cooled in one or more heat exchangers 20 before entering tubular reactor 18. Other split streams can be cooled in one or more coolers 22a, 22b and introduced to the tubular reactor 18 at different points. The tubular reactor 18 can also include two or more initiator, such as at least four, injection points along its length. The initiator and optionally one or more diluents/solvents can be fed to the reactor 18 from an initiator injection system that can include one or more initiator sources 26, one or more initiator storage vessels 28, and one or more initiator mix and charge systems 30.

Although not shown in the schematic diagram of FIG. 1, the tubular reactor 18 comprises a plurality of reaction zones spaced along the length of the reactor, wherein each reaction zone comprises an inlet and an outlet, and wherein adjacent reaction zones are separated by a cooling zone. Initiator is added to the inlet of each reaction zone and the conditions in the reactor 18 are controlled so that the temperature at the inlet of each reaction zone is less than 150° C. and the temperature at the outlet of each reaction zone is at least 177° C.

From the reactor 18, the exiting mixture of polymer alone or in combination with unreacted monomer (also referred to as "the product stream") via stream 31 can pass through a high pressure let down valve 32. The high pressure let down valve 32 can be controlled to maintain the desired pressure in the reactor 18. From the high pressure let down valve 32, the product stream can flow through the jet pump 7 and then into a separation system that can include one or more high pressure separation ("HPS") vessels 36 and one or more low pressure separation ("LPS") vessels 39.

The high pressure separation vessel 36 can separate the product stream 31 into a stream of unreacted monomer gas 37 and a polymer rich liquid or liquid phase 38. The separated monomer gas can be directed to a recycle gas system 12. The recycle gas system 12 can include one or more waste heat boilers, one or more coolers for cooling the recycle gas, and one or more knock-out pots for dewaxing. The cooled and dewaxed gas exiting the recycle system 12 can flow back to the reactor feed 11 of the second compressor 10.

The polymer rich liquid 38 can be further separated in the one or more low pressure separation vessels 39. The low pressure separation vessel 39 can operate at a pressure of from 0.5 bar to 2.0 bar (0.050 to 0.200 MPa). Molten polymer leaves the low pressure separation vessel 39 via an outlet in the bottom of that vessel (line 40) and passes through a conduit into the intake of one or more hot melt extruders 41. One or more additives to modify the properties of the extruded polymer can be added to the extruder 41 via one or more sources 42 of masterbatch additives. The one or more extruders 41 convert the molten polymer into strings that are chopped, cooled, dried via one or more dryers 44, and then transferred to one or more blenders 46. The polymer resin can then be packaged and shipped to an end user.

In some embodiments, the reactor feed stream 11 (i.e., ethylene feed) is provided to a pressure separation unit such as the low pressure separator 39 operating at conditions sufficient to remove at least a portion of the unreacted polar monomer from the reaction system effluent. In particular embodiments, such conditions include a separator pressure of less than 3.0 bar (0.30 MPa), preferably less than about 1.5 bar (0.15 MPa), more preferably from 0.75 bar to 1.5 bar (0.075 MPa to 0.15 MPa). The reactor feed stream 11 may be provided before or after the feed stream 11 passes through the primary and/or second compressors, 5 and 10 respectively. Preferably, the ethylene, provided to the low pressure separator provides an amount of ethylene at a temperature sufficient to cause a temperature drop at the pressure separator inlet of from 10.0° C. to 140.0° C., preferably 10.0° C. to 80.0° C., more preferably 30.0° C. to 60.0° C. The ethylene stream is taken from one or more points in the process where the pressure is 30 bar to 80 bar (0.30 MPa to 0.80 MPa) and more often from 35 bar to 50 bar (0.35 MPa to 0.50 MPa). The temperature can range from 5.0° C. to 50.0° C. and more often is near ambient temperature. The amount of ethylene added can range from 10% to 140% of the reactor polymer production rate. The ethylene may be directed to the low pressure separator input via any convenient path, e.g., reactor feed stream 11, the output of the purge gas compressor 49d, or the ethylene feed via line 49e.

In the low pressure separation vessel 39, at least a portion, if not all, of the remaining monomer is recovered as an off gas that is compressed in one or more purge gas compressors 48. Any portion of the compressed purge gas can be sent to off-site storage sites 49a and 49b. Likewise, any portion of the compressed purge gas can be recycled to the inlet of the primary compressor 5 via the purge gas recycle (PGR) stream 49c. For example, about 10.0 vol %, 20.0 vol %, 30.0 vol %, 40.0 vol %, 50.0 vol %, 60.0 vol %, 70.0 vol %, 80.0 vol %, 90.0 vol %, or 95.0 vol % of the purge gas recycle (PGR) stream 49c can be sent to off-site storage sites or further processing equipment 49a and 49b, and the balance can be recycled to the inlet of the primary compressor 5. In some embodiments as described above, the output of the purge gas compressor is directed through line 49d to the inlet of the low pressure separator 39.

In some embodiments, the unreacted polar comonomer, e.g., vinyl acetate, monomer can be separated from the purge gas recycle (PGR) stream 49c in the off-site system 49b. The separated polar comonomer can then be recycled to the inlet of the secondary compressor 10 via a recycle vinyl acetate (R-VAM) stream 52.

It is to be appreciated that operation of the compressors 5 and 10 requires the use of lubricants to reduce friction between the moving parts of the compressors, such as between plungers/pistons and cylinders. Given the high operating pressures and the architecture of these compressors, these lubricants inevitably leak into the monomer feed and eventually into the polymer product. Thus the type of lubricant used in the compressors 5 and 10 can have some influence on the properties of the polymer product. Although any known form of lubricant compatible with ethylene polymers can be used in the compressors 5 and 10, including both polar and non-polar lubricants, for applications where high volume resistivity is advantageous, non-polar lubricants, such as mineral oils are preferred.

EXAMPLES

The invention will now be more particularly described with reference to the following non-limiting Examples and FIG. 2 to FIG. 4 of the accompanying drawings.

In the Examples, the following procedures are employed to generate the reported gel permeation chromatography (GPC), differential scanning calorimetric (DSC) tests, small amplitude oscillatory shear (SAOS) and volume resistivity data.

GPC measurements are made using a High Temperature Gel Permeation Chromatograph (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI} / (dn/dc),$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm³, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2,$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits.

The branching index $g'_{vis}$ is defined as:

$$g'vis = \frac{[\eta]_{avg}}{k M_v^\alpha},$$

$M_v$ is the viscosity-average molecular weight based on molecular weights determined by LS analysis. Z average branching index ($g'z_{ave}$) is calculated using Ci=polymer concentration in the slice i in the polymer peak times the mass of the slice squared, $M_i^2$.

All molecular weights are weight average unless otherwise noted. All molecular weights are reported in g/mol unless otherwise noted.

SAOS melt rheological characterizations were performed using an ARES-G2 (TA Instruments) rheometer equipped with a parallel-plate fixture. Small-strain (5%) oscillatory shear measurements were performed at 100° C.

Volume resistivity analysis was performed using a test method based on ASTM D257.

DSC measurements was performed using a test method based on ASTM D 3417/D 3418.

Examples 1 to 3

Two experimental ethylene vinyl acetate (EVA) copolymers with 28 wt % vinyl acetate content (or derived units) and varying melt index (MI), 25 MI in Example 1 and 30 MI in Example 2, were produced using a tubular reactor similar to that shown in FIG. 1. These were compared against a control product (Example 3) contemporaneously produced in the same tubular reactor. Reactor conditions for the three different runs are given in Table 1 below. In each run the modifier was propylene. In Examples 1 and 2, the initiator package was composed of 210 lbs di(2-ethylhexyl) peroxydicarbonate (EHP), 105 lbs t-butyl-peroxypivalate (pivalate), 9 lbs Irganox 1076, 0.8 lbs Isopar H, and 100 US gallons of butane, whereas in Example 3 the initiator package was composed of 70 lbs t-butyl-peroxyneodecanoate (decanoate), 70 lbs t-butyl-peroxypivalate (pivalate), 70 lbs t-butyl-peroxy-2-ethylhexanoate (peroctoate), 9 lbs Irganox 1076, 0.8 lbs Isopar H, and 100 US gallons of butane.

LD755.CM and the material of Example 3). Surprisingly, the molecular weight distribution for the materials of Examples 1 and 2 is very close to that of the commercial autoclave reactor product (Escorene™ Ultra UL02528). As can be seen from Table 3, the products of Examples 1 and 2 also show significantly higher branching across the overall molecular weight distribution (g' Vis. Average) and higher branching at high molecular weight part (g' Z Average). In this respect, it will be appreciated that lower numbers for g' Vis. Average and g' Z Average are indicative of higher branching. This broad molecular weight distribution and higher long chain branching can in turn provide better processability and melt strength advantages.

TABLE 1

|  | Example 3 (Control) | | Example 1 | | Example 2 | |
| --- | --- | --- | --- | --- | --- | --- |
|  | Target | Actual (average) | Target | Actual (average) | Target | Actual (average) |
| Hot melt MI (dg/min) | 28.2 | 28.8 | 28.2 | 28.5 | 33.7 | 33.3 |
| Final Melt Index (dg/min)* | 25.0 | 25.6 | 25.0 | 25.3 | 30.0 | 29.6 |
| VA (wt %) | 27.6 | 27.9 | 27.6 | 27.5 | 27.6 | 27.0 |
| Reactor Pressure (kpsi) | 40 | 39.9 | 36 | 36.6 | 36 | 36 |
| 1st Inlet Temperature (° F.) | 315 | 315 | 275 | 276 | 275 | 275 |
| 1st Peak Temperature (° F.) | 430 | 430 | 430 | 430 | 430 | 430 |
| 2nd Inlet Temperature (° F.) | 315 | 340 | 275 | 345 | 275 | 367 |
| 2nd Peak Temperature (° F.) | 425 | 425 | 425 | 426 | 425 | 425 |
| 3rd Inlet Temperature (° F.) | 310 | 310 | 275 | 275 | 275 | 283 |
| 3rd Peak Temperature (° F.) | 415 | 415 | 415 | 415 | 415 | 415 |
| 4th Inlet Temperature (° F.) | 310 | 293 | 275 | 290 | 275 | 276 |
| 4th Peak Temperature (° F.) | 415 | 415 | 415 | 415 | 415 | 415 |
| Modifier Flow, (wt % of copolymer production) | — | 1 | — | 0.25 | — | 0.31 |
| Production Rate (Klbs/hr) | — | 14.3 | — | 15.7 | — | 14.3 |

Gel permeation chromatography (GPC), differential scanning calorimetric (DSC) tests and small amplitude oscillatory shear (SAOS) rheology experiments were conducted on the products of Examples 1 to 3 to investigate possible differences in the molecular architecture of the products. For comparison purposes, similar investigations were conducted on a commercial tubular reactor-made product (Escorene™ Ultra LD755.CM) and a commercial autoclave reactor-made product (Escorene™ Ultra UL02528) of same VA % (VA=vinyl acetate) and MI (28 wt % VA and 25 MI) was used for comparison purposes, both products being commercially available from ExxonMobil Chemical Company, Houston, Tex. Table 2 illustrates the MI, % VA and reactor type for comparison purposes.

TABLE 2

| Sample | MI at 190° C., g/10 min | % VA Content (wt %) | Reactor Type |
| --- | --- | --- | --- |
| Example 1 | 25 | 27.5 | Tubular |
| Example 2 | 30 | 27.0 | Tubular |
| Example 3 (Control) | 26 | 27.9 | Tubular |
| Escorene ™ Ultra LD755.CM (Control)# | 25 | 27.6 | Tubular |
| Escorene ™ Ultra UL02528 (Control)# | 25 | 28 | Autoclave |

VA = vinyl acetate derived units

Figure 2:
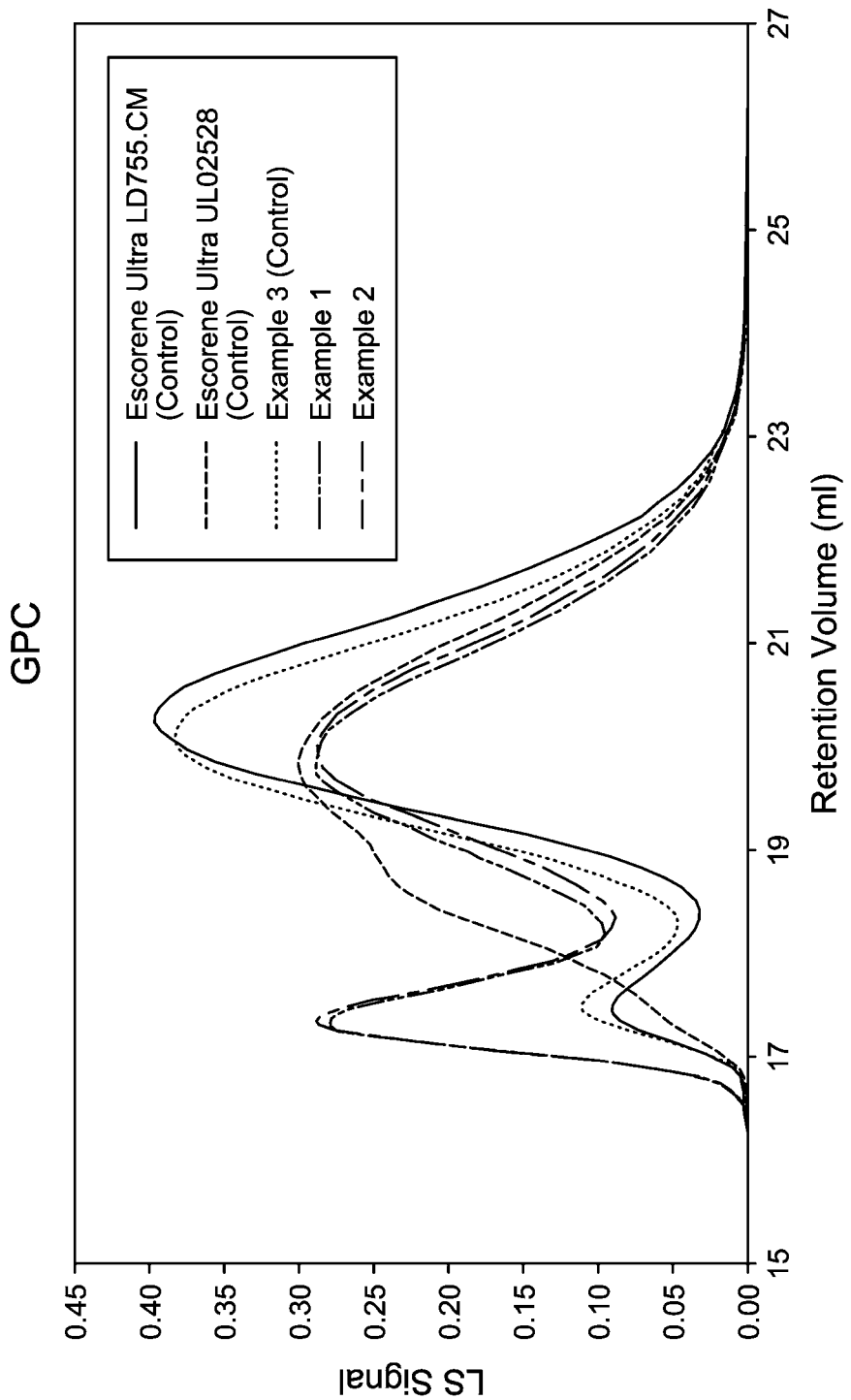
FIG. 2 is a graph of light scattering against retention volume for the gel permeation chromatograms obtained from the EVA copolymers produced according to Examples 1 to 3 and from two commercially available EVA copolymer serving as controls.

The results of the GPC experiments are summarized in FIG. 2 and Table 3. As can be seen from FIG. 2, the materials of Examples 1 and 2 produced in a tubular reactor clearly show significant differences in molecular weight distribution compared to the tubular controls (Escorene™ Ultra

TABLE 3

| Sample | g' (Vis. Average) | g' (Z Average) |
| --- | --- | --- |
| Escorene ™ Ultra LD755.CM (Control) | 0.707 | 0.64 |
| Escorene ™ Ultra UL02528 (Control) | 0.629 | 0.44 |
| Example 3 (Control) | 0.616 | 0.36 |
| Example 1 | 0.545 | 0.19 |
| Example 2 | 0.576 | 0.18 |

The results of the DSC tests are summarized in Table 4, from which it will be seen that the products of Examples 1 and 2 exhibited lower crystallization temperatures than the respective tubular reactor controls (LD755.CM and Example 3 product). Interestingly for the same MI (25) and VA % (28 wt %), the tubular product of Example 1 showed similar crystallization temperatures to the commercial autoclave product UL2528, again confirming the resemblance of the tubular products of Examples 1 and 2 to autoclave produced products in processability.

TABLE 4

| Sample | Peak Melting Temperature (° C.) | Melting Enthalpy (J/g) | Peak Crystallization Temperature—Tc (° C.) | Crystallization Enthalpy (J/g) |
| --- | --- | --- | --- | --- |
| Escorene ™ Ultra LD755.CM (Control) | 79 | 73 | 58 | 76 |
| Escorene ™ Ultra UL02528 (Control) | 71 | 56 | 49 | 57 |

TABLE 4-continued

| Sample | Peak Melting Temperature (° C.) | Melting Enthalpy (J/g) | Peak Crystallization Temperature—Tc (° C.) | Crystallization Enthalpy (J/g) |
|---|---|---|---|---|
| Example 3 (Control) | 68 | 42 | 46 | 52 |
| Example 1 | 68 | 44 | 48 | 55 |
| Example 2 | 71 | 50 | 51 | 59 |

Figure 3:
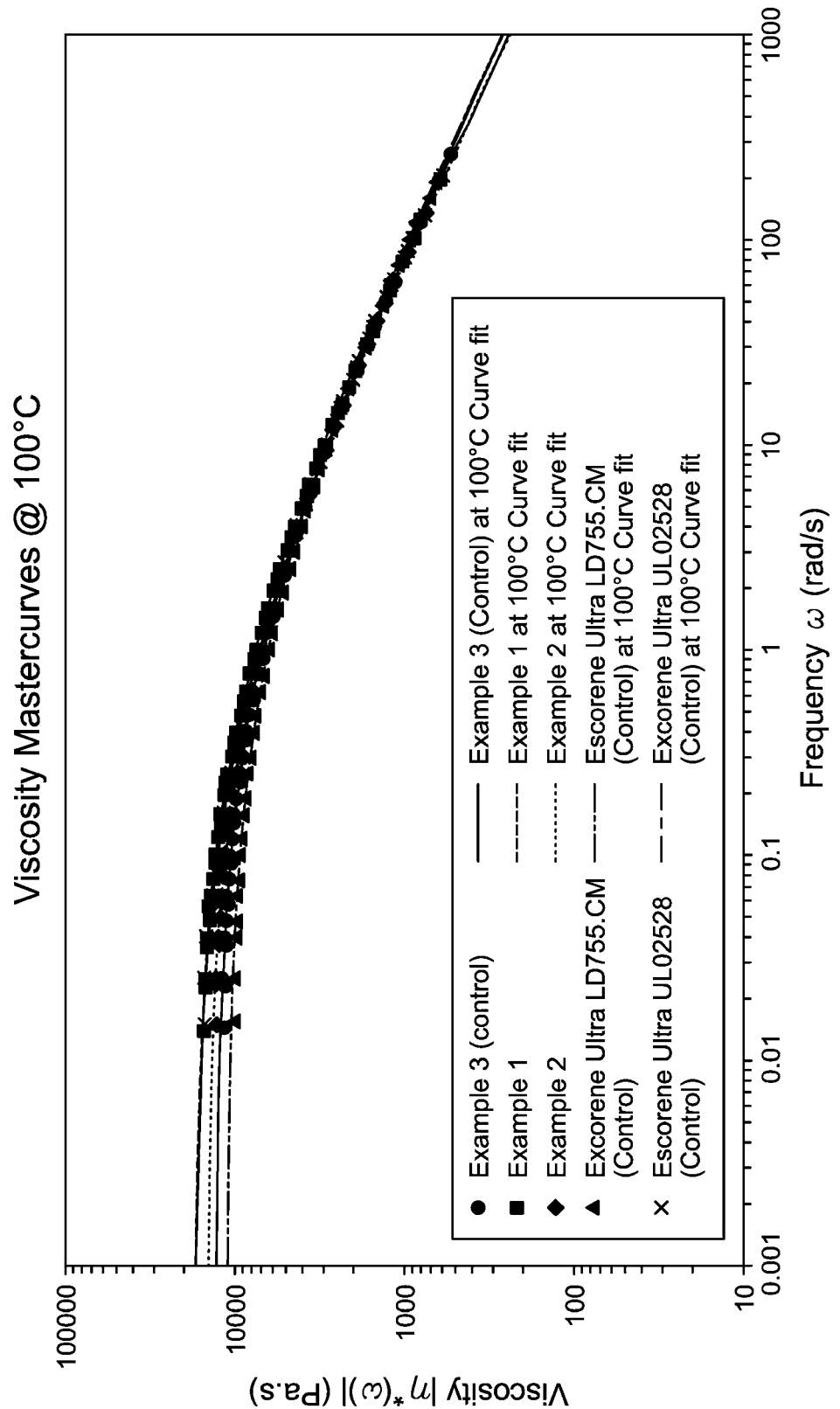
FIG. 3 compares the small angle oscillatory shear (SAOS) viscosity mastercurves for the EVA copolymers produced according to Examples 1 to 3 and for two commercially available EVA copolymer serving as controls.
Figure 4:
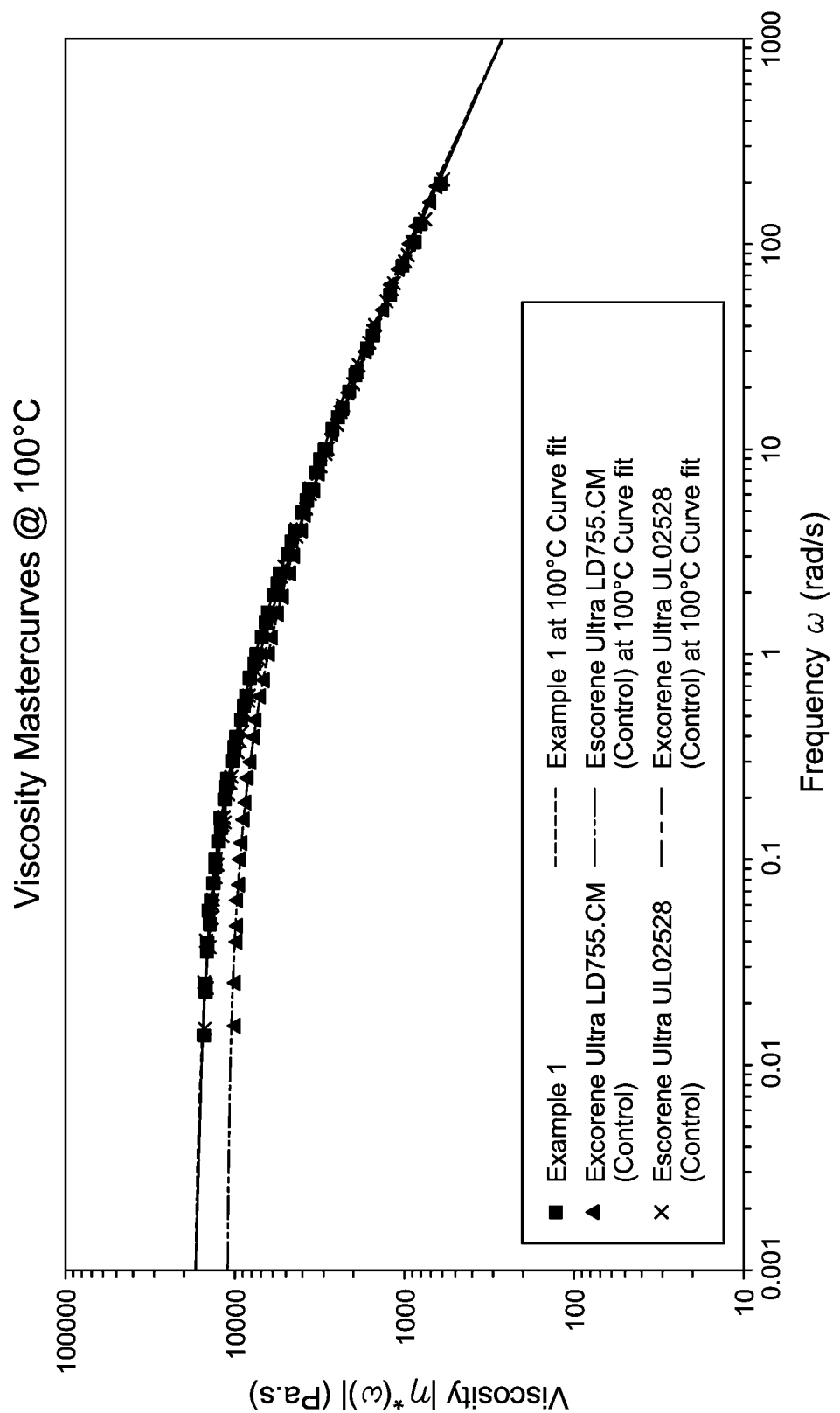
FIG. 4 compares the small angle oscillatory shear (SAOS) viscosity mastercurves for the EVA copolymer produced according to Example 1 and for two commercially available EVA copolymer serving as controls.

The results of the flow property analysis using SAOS rheology are shown in FIG. 3 and FIG. 4 and confirm that, for the same MI (25) and VA % (28% VA), the tubular product of Example 1 shows the same rheological profile (the curves lie on the top of each other) as the commercial autoclave product UL2528, while the traditional tubular products (LD755.CM control and Example 3 product) show a slightly different rheological profile. Once again, these results reaffirm the flow and processability similarities of the new tubular products to autoclave products.

The electrical properties of the products of Examples 1 and 2 and the control materials were also measured and the results are summarized in Table 5. The materials of Examples 1 and 2 also show very good electrical characteristics, especially volume resistivity which is a very important attribute for wire and cable and photo voltaic (PV) cell encapsulant applications. The higher the volume resistivity for the polymer the better the insulation and other electrical properties.

TABLE 5

| Sample | Thickness (cm) | Resistance (MΩ) | Volume resistivity (Ω·cm) |
|---|---|---|---|
| LD 755CM Control | 0.146 | 2.4E+06 | 3.3E+14 |
| UL 02528 Control | 0.148 | 3.8E+06 | 5.1E+14 |
| Example 3 Control | 0.148 | 4.1E+06 | 5.5E+16 |
| Example 1 | 0.146 | 4.4E+06 | 6.0E+16 |
| Example 2 | 0.146 | 5.6E+06 | 7.7E+16 |

The improved volume resistivity characteristics for the tubular polymers of Examples 1 and 2 may not be solely due to the molecular architecture, since the polymer of Example 3 also shows improved volume resistivity characteristics as compared with the commercial tubular product, Escorene™ Ultra LD755.CM. Higher volume resistivity may be at least partly attributed to the use of a less polar compressor oil (i.e., a mineral oil based lubricant, M-RARUS PE KPL 201, supplied by ExxonMobil) for the trials reported in Examples 1 to 3, while a more polar compressor oil (i.e., a polyalkylene glycol) was used during production of the LD755.CM control. The more polar oil may have contributed to lower volume resistivity for the LD755.CM control.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A process for producing an ethylene copolymer, the process comprising:
(a) contacting ethylene with at least one polar comonomer in the presence of at least one modifier and at least one free radical initiator in a tubular reactor under polymerization conditions including a pressure of from 225 to 270 MPa;
(b) injecting the at least one free radical initiator into the reactor at a plurality of reaction zones spaced along the length of the reactor, wherein each reaction zone comprises an inlet and an outlet;
(c) maintaining the temperature at the inlet of each reaction zone at 150° C. or less, and the temperature at the outlet of each reaction zone at at least 177° C.;
(d) controlling the modifier flow at a rate of from 0.02 to 0.986 wt % of the copolymer; and
(e) recovering the ethylene copolymer from the tubular reactor, the ethylene copolymer having: (i) polydispersity index greater than 1.0; (ii) a viscosity average branching index of at least 0.25; (iii) a Z average branching index of at least 0.08; and (iv) a volume resistivity (Ω·cm) of 2.5E+14 Ω·cm to 7.7E+17 Ω·cm.

2. The process of claim 1, wherein the polymerization conditions include a pressure of from 230 to 255 MPa.

3. The process of claim 1, wherein the temperature at the inlet of each reaction zone is from 125 to 145° C.

4. The process of claim 1, wherein the temperature at the outlet of each reaction zone is at least 200° C.

5. The process of claim 1, wherein the modifier flow is controlled at a rate of from 0.1 to 0.6 wt % of the copolymer.

6. The process of claim 1, wherein the modifier is selected from the group consisting of at least one of propylene, propane, butenes, butanes, pentenes, hexenes, hexanes, acetaldehyde, propionaldehyde, and mixtures thereof.

7. The process of claim 1, wherein the modifier comprises propylene.

8. The process of claim 1, wherein the free radical initiator comprises organic peroxides.

9. The process of claim 1, wherein the at least one polar comonomer comprises vinyl acetate and the copolymer comprises an ethylene-vinyl acetate copolymer.

10. The process of claim 9, wherein the ethylene-vinyl acetate copolymer comprises from 3 to 45 wt % vinyl acetate derived units.

11. The process of claim 9, wherein the ethylene-vinyl acetate copolymer comprises from 10 to 45 wt % vinyl acetate derived units.

12. The process of claim 9, wherein the ethylene-vinyl acetate copolymer comprises from 20 to 33 wt % vinyl acetate derived units.

13. The process of claim 9, wherein the ethylene-vinyl acetate copolymer has a melt index of 1 to 990 g per 10 minutes as measured at 190° C. under a load of 2.16 kg according to ASTM D1238.

14. The process of claim 9, wherein the ethylene-vinyl acetate copolymer has a melt index of 15 to 50 g per 10 minutes as measured at 190° C. under a load of 2.16 kg according to ASTM D1238.

15. The process of claim 9, wherein the ethylene-vinyl acetate copolymer has a melt index of 22 to 32 g per 10 minutes as measured at 190° C. under a load of 2.16 kg according to ASTM D1238.

16. The process of claim 1, wherein the process comprises a primary compressor and a secondary compressor, the primary compressor and the secondary compressor each use a lubricating oil, and the lubricating oil comprises a nonpolar compressor oil.

* * * * *